Patented Dec. 20, 1927.

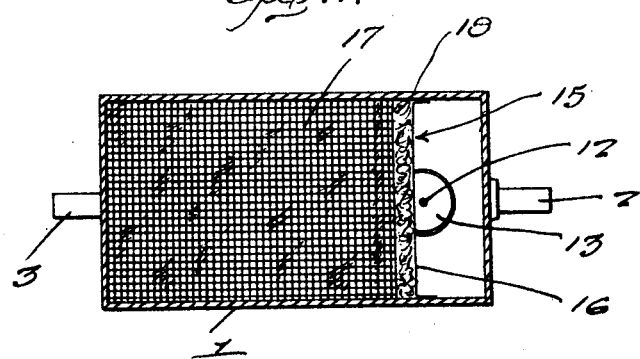
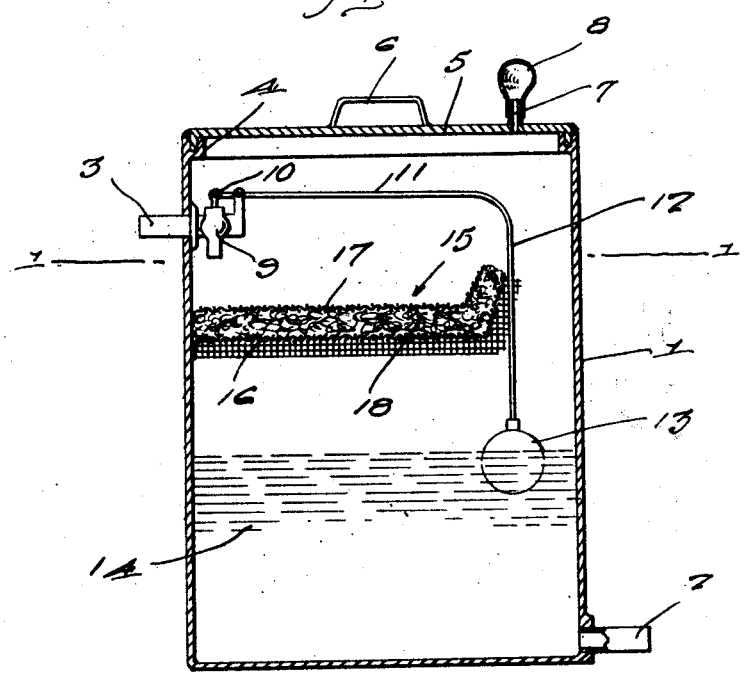

1,653,204

UNITED STATES PATENT OFFICE.

HORACE OTTO DAHLIN, OF HARRISBURG, PENNSYLVANIA.

WATER STORAGE AND FILTER TANK.

Application filed April 20, 1925. Serial No. 24,564.

This invention relates to an improved tank for storing and filtering water, and while it is not to be restricted to any particular use, it is especially adapted for installation in the water supply system of a soda water fountain.

In the ordinary circulating and supply system of fountains of this class, it has been observed that the pump is subjected to leakage due to a constant back pressure exerted thereon by the water. Furthermore, it has been observed that the city water pressure is frequently of such magnitude that the gas pressure from the carbonating machine fails to hold the water back. The result is that water is frequently taken into the carbonator when the pump is not working, and the result is that the water issuing from the spigot at the fountain is of a poor quality.

The present device has been constructed with a view toward overcoming these disadvantages and at the same time properly filtering the water before it reaches the fountain for use, whereby to remove foreign matter collected during passage through corroded pipes, pumps, etc.

Other features and advantages of the invention will become apparent from the following description and drawing.

In the accompanying drawing forming a part of this application and in which like numerals are employed to designate like parts throughout the same:

Figure 1 is a horizontal section through the upper portion of a tank constructed in accordance with the present invention, the section being taken approximately upon the plane of the line 1—1 of Fig. 2.

Fig. 2 is a central vertical section through the tank.

Referring to the drawings in detail, the reference character 1 designates the tank which is provided at its bottom with a water outlet 2 and at its top in an opposed side with a water inlet 3. The tank is open at its top and is provided with a channel 4 in which the downturned flange of a removable cover plate 5 is received. The cover plate is provided with a handle 6 by means of which it may be easily handled. The cover plate is also provided with a nipple 7 and a common rubber balloon bulb or the like 8 is attached to its neck as to serve as a pressure indicator. It will be observed that the inlet 3 extends into the interior of the tank and is provided with a casing 9 in which a valve is arranged. To control the passage of water into the tank, the stem 10 of the valve extends above the casing and an operating rod 11 is connected thereto. It will be observed that this operating rod includes a depending portion 12 on the lower end of which is a ball float 13 which serves to control the normal fluid level of the water 14 in the tank.

Also located in the tank is a filter 15 including a fixedly mounted lower screen partition 16 and an upper screen 17 which is spaced therefrom to provide a space for a filler 18 of appropriate filtering material. It will be noted that this filter has one end terminating in spaced relation from the adjacent wall of the tank particularly for accommodating the float operated rod 11.

In practice the water from the pump enters the tank through the valved intake 3 and fills up the system and partially fills the tank to the approximate level shown. When this level is reached, the ball float valve is raised upwardly to actuate the valve rod for closing the valve in the casing 9, thus cutting off further flow of water. The water in flowing into the system must pass through the filter 15 and it is thus effectively strained to remove impurities and foreign matter.

It is thought that persons skilled in the art to which the invention relates will appreciate and will understand the invention from the foregoing description and drawing. For this reason a more lengthy description is thought unnecessary.

While the preferred embodiment of the invention has been shown and described, it is to be understood that minor changes coming within the field of invention claimed may be resorted to if desired.

What is claimed as new is:—

As a new article of manufacture, a filtering and pressure reducing device for installation in a storage and filter tank such as is used in a carbonated water supply system for soda fountain, said device comprising spaced screens with a filter of absorbent material therebetween, one end of said device being directed upwardly and being adapted to terminate in spaced relation from an adjacent end wall of the tank in which the device is intended to be supported in order to accommodate the depending portion of a float operated rod which is located in the aforesaid tank.

In testimony whereof I affix my signature.

HORACE OTTO DAHLIN.